Patented Mar. 28, 1933                                            1,902,889

UNITED STATES PATENT OFFICE

MAX PAQUIN, OF KONIGSTEIN-ON-TAUNUS, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

UREA CONDENSATION PRODUCTS AND PROCESS OF MAKING THEM

No Drawing. Original application filed September 30, 1927, Serial No. 223,232, and in Germany October 4, 1926. Divided and this application filed August 31, 1928. Serial No. 303,368.

My present invention relates to metal compounds of condensation products from amidocarbonic acid derivatives and an alcohol or a ketone and a process of preparing them.

It is known that urea or its derivatives when treated with an alcohol or a ketone, or a derivative thereof, are transformed into well-defined crystalline compounds.

As I have set forth in my co-pending application Serial No. 223,232, filed September 30, 1927, when working under suitable conditions the reaction in question not only leads to the formation of the compounds above referred to, but in its further progress to the formation of amorphous products. These products may be of a viscous liquid to resinous character.

Condensation products are accordingly obtained when causing to act upon each other at temperatures between about 0° C. and about 300° C., an amidocarbonic acid derivative of the following constitution

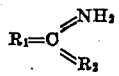

wherein $R_1$ stands for oxygen or sulfur, $R_2$ for $NH_2$, NH-acyl, O-alkyl or O-aryl and a compound containing an alcoholic hydroxy group such as benzyl alcohol, cyclohexanol and its homologues, aminoalcohols e. g. triethanolamine, glycerol and the partially esterified or etherified derivatives thereof, glycols and their derivatives etc.

The amorphous condensation products obtainable by my new process, which appear to be substantially a mixture of urethanes and imino dicarboxylic acid ester, are water-soluble, if their alcohol content is water-soluble, and if for the starting material pure urea is used. However, if water-insoluble alcohols are acted upon with urea or water-soluble alcohols acted upon with water-insoluble urea derivatives, there are generally obtained water-insoluble products.

According to my present invention I have found that it is possible to prepare metal compounds from the above characterized viscous liquid to resinous reaction products. Certain metals, particularly the alkali metals or alkali-earth metals and also zinc, cadmium and similar metals, when introduced during or after completion of the reaction between the urea and alcohol or ketone are dissolved with evolution of hydrogen and there are obtained in this manner products which are distinguished from those which are free from metal by the fact that their viscosity is extremely high. In many cases the solubility of the products in water is still improved by converting them into the corresponding metal compounds.

The cited products resulting from the reaction between the ureas and alcohols or the metal compounds of these reaction products, can be brought to reaction with any aldehyde at temperatures between about 30° C. and about 200° C. When using formaldehyde for instance there are obtained, according to the duration, the intensity and the quantity of formaldehyde subjected to the reaction, amorphous products of a liquid viscous or resinous consistency.

The above described products can be used for a great variety of purposes, for instance they may be employed as softening agents for cellulose esters or cellulose ethers, moreover as a substitute for natural or artificial (synthetic) resins of every kind and similar substances. In an analogous manner the products in question may be utilized for substances which swell up in water, in particular albuminous substances to be used for elastification and hardening purposes. Some of the products in question exercise a peculiar effect on lacquers from nitrocellulose, namely by preventing them from becoming gelatinized and assuming a green color which occurs when metal bronzes containing copper are present.

The following examples serve to illustrate my invention but they are not intended to limit it thereto, the parts being parts by weight.

1. 180 parts of butyleneglycol are boiled in the reflux apparatus with 80 parts of urea and 5 parts of metallic calcium. During the reaction the metal dissolves with evolution of hydrogen and after 45 minutes a yellow viscous oil is obtained.

2. 200 parts of glycerinacetaldehydeacetal are boiled in the reflux apparatus with 80 parts of urea, 70 parts of toluenesulfamide and 5 parts of magnesium metal powder. The metal dissolves with evolution of hydrogen and a highly viscous light yellow oil is obtained.

This application is a division of my copending U. S. patent application Ser. No. 223,232 filed September 30, 1927.

I claim:

1. The process of preparing condensation products, which comprises causing to act upon each other at a temperature between about 0° and about 300° C. an amidocarbonic acid derivative of the following constitution:

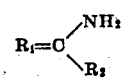

wherein $R_1$ stands for oxygen or sulfur and $R_2$ for $NH_2$, NH-acyl, O-alkyl or O-aryl and an excess of a compound containing an alcoholic hydroxy group and a metal selected from the group consisting of the alkaline and alkali-earth metals, zinc and cadmium.

2. The process of preparing condensation products, which comprises causing to act upon each other at a temperature between 0° and about 300° C. an amidocarbonic acid derivative of the following constitution:

wherein $R_1$ stands for oxygen or sulfur and $R_2$ for $NH_2$, NH-acyl, O-alkyl or O-aryl and an excess of a compound containing an alcoholic hydroxy group and a metal selected from the group consisting of the alkaline and alkali-earth metals, zinc and cadmium and then causing an aldehyde to act upon the condensation products thus obtained at a temperature between about 30° C. and 200°.

3. The process of preparing condensation products, which comprises causing to act upon each other at a temperature between about 0° and about 300° C. an amidocarbonic acid derivative of the following constitution:

wherein R stands for oxygen or sulfur and an excess of a compound containing an alcoholic hydroxy group and an alkali-earth metal.

4. The process of preparing condensation products, which comprises causing to act upon each other at a temperature between about 0° and about 300° C. an amidocarbonic acid derivative of the following constitution:

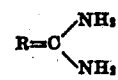

wherein R stands for oxygen or sulfur and an excess of a compound containing an alcoholic hydroxy group and another amino compound not derived from urea and an alkali-earth metal.

5. The process of preparing condensation products, which comprises boiling a mixture of urea, butylene glycol and metallic calcium.

6. The process of preparing condensation products, which comprises boiling a mixture of urea, glycerin acetaldehyde acetal, toluene-sulfamide and magnesium metal powder.

7. As new products, condensation products obtainable by the process set forth in claim 5, said products being of a viscous liquid to resinous character and suitable for being employed for instance as softening agents for cellulose ethers or cellulose ethers.

8. As new products, condensation products obtainable by the process set forth in claim 6, said products being of a viscous liquid to resinous character and suitable for being employed for instance as softening agents for cellulose ethers or cellulose esters.

9. As new products, condensation-products obtainable by the process set forth in claim 1, said products being of a viscous liquid to resinous character and suitable for being employed for instance as softening agents for cellulose-ethers or cellulose-esters.

10. As new products, condensation-products obtainable by the process set forth in claim 2, said products being of a viscous liquid to resinous character and suitable for being employed for instance as softening agents for cellulose ethers or cellulose-esters.

11. As new products, condensation-products obtainable by the process set forth in claim 3, said products being of a viscous liquid to resinous character and suitable for being employed for instance as softening agents for cellulose-ethers or cellulose-esters.

12. As new products, condensation-products obtainable by the process set forth in claim 4, said products being of a viscous liquid to resinous character and suitable for being employed for instance as softening agents for cellulose-ethers or cellulose-esters.

In testimony whereof, I affix my signature.

MAX PAQUIN.